(No Model.)

J. FOLGER.
MEAT SPREADER.

No. 370,615. Patented Sept. 27, 1887.

Witnesses.
E. Friedlander.
L. H. Colburn.

Inventor.
Jacob Folger.
per L. H. Colburn,
Attorney.

N. PETERS, Photo-Lithographer, Washington, D. C.

UNITED STATES PATENT OFFICE.

JACOB FOLGER, OF TOLEDO, OHIO.

MEAT-SPREADER.

SPECIFICATION forming part of Letters Patent No. 370,615, dated September 27, 1887.

Application filed October 7, 1886. Serial No. 215,536. (No model.)

*To all whom it may concern:*

Be it known that I, JACOB FOLGER, a citizen of the United States, residing at Toledo, in the county of Lucas and State of Ohio, have invented a new and useful Improvement in Meat-Spreaders, of which the following is a specification.

My invention relates to an improvement in meat-spreaders which are used by butchers for the purpose of spreading the two sides of a creature apart while the said sides are being severed in the process of preparation for market.

The appliances of this class which have hitherto been in use have usually been provided with long sharp steel-pointed ends, which ends deeply puncture and render unsightly and partially unsalable the flesh of the creature upon which such an instrument is used.

The object of my improvement, besides producing a strong, durable, cheap, and convenient instrument for the purpose hereinbefore named, is, first, to do away with the long lacerating points which are common to the meat-spreaders now in general use and to substitute therefor an appliance which will avoid the injury to the meat hereinbefore referred to, and, secondly, to provide the said appliance with means for rigidly supporting the same in position when in use. I attain this object by the device illustrated in the accompanying drawings, in which—

Figure 1:
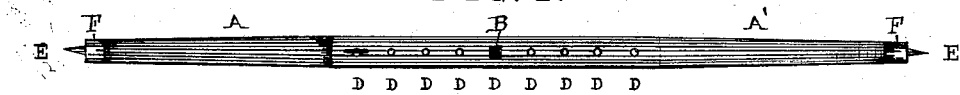
Figure 2:
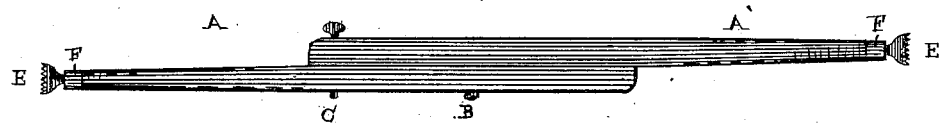
Figure 3:
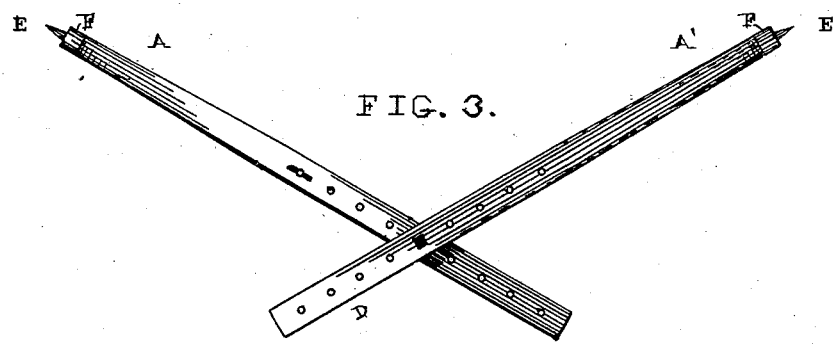
Figure 4:
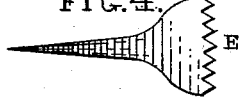
Figure 5:
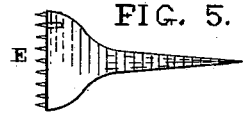

Figure 1 is a plan or top view. Fig. 2 is a side view or elevation. Fig. 3 is a plan or view showing the instrument open ready for application. Fig. 4 is an enlarged side view of one of the toothed spurs. Fig. 5 is also an enlarged side view of one of the toothed spurs, the spurs in this case being made differently from those shown in Fig. 4.

A and A' represent two bars, which are preferably made of wood, though other material may serve as good a purpose, which parts A and A' are pivotally connected by means of the bolt B and rigidly connected by the addition of the removable pin C.

D D are a series of holes which are equidistant and are alike in both the bars A A', any pair of which holes may be occupied by the bolt B and the pin C.

E E are wide-toothed spurs, each having a series of short teeth on its face. The shanks of these spurs are inserted in the ends of the bars A in such a manner that their faces will lie across said ends in a diametric line, and ferrules F confine the sides of the bars near the ends to prevent the splitting of the same.

The reasons for having the bars A and A' in two pieces are twofold, first, that the device may be lengthened or shortened at pleasure to adapt it to the range of work which it has to perform, and, secondly, that it may be more easily applied by the toggle-lever motion and power thus gained, as is illustrated by the varied distance apart of the spurs at the ends in Figs. 2 and 3. The toothed spurs E E in Fig. 3 having been adjusted a proper distance apart by means of the bolt B being placed in the proper holes in the bars A and A', the instrument is ready to be applied, which application is as follows: With the instrument opened, as shown in Fig. 3, it is placed with the spurs E E in contact with the portions of meat to be forced apart. The device is then straightened and the pin C put in position, as shown in Figs. 1 and 2. The toothed spurs E E, in their application to the body of the animal, are, by their extra breadth over the old appliances for this use, adapted to contact principally with only the long parts of the animal, and this instrument thereby avoids the tearing and mutilating effect of all other instruments of this class.

I am aware that carpet-stretchers composed of two bars adjustably pivoted near their inner ends and having serrated teeth at their outer ends are old, and therefore I lay no claim, broadly, to the same; but What I do claim as new, and desire to secure by Letters Patent, is—

The herein-described meat-spreader, comprising the combination, with the two arms A and A', each having the spur E in its outer end and each being provided with a series of adjusting-holes, D, through its body, of the bolt B, passing through a pair of said holes for pivotally connecting the arms, and the pin C, adapted to be passed through another and remote pair of said holes for locking the arms in alignment, substantially as and for the purpose described.

JACOB FOLGER.

Witnesses:
BENJ. RAITZ,
VALENTINE F. STELZER.